US010805851B2

(12) United States Patent
Sivavakeesar

(10) Patent No.: US 10,805,851 B2
(45) Date of Patent: Oct. 13, 2020

(54) COMMUNICATIONS SYSTEM WITH IDLE MODE TERMINAL BALANCING

(71) Applicant: NEC Corporation, Minato-ku, Tokyo (JP)

(72) Inventor: Sivapathalingham Sivavakeesar, Milton Keynes (GB)

(73) Assignee: NEC CORPORATION, Tokyo (JP)

( * ) Notice: Subject to any disclaimer, the term of this patent is extended or adjusted under 35 U.S.C. 154(b) by 166 days.

(21) Appl. No.: 15/500,201

(22) PCT Filed: Jul. 24, 2015

(86) PCT No.: PCT/JP2015/003724
§ 371 (c)(1),
(2) Date: Jan. 30, 2017

(87) PCT Pub. No.: WO2016/021137
PCT Pub. Date: Feb. 11, 2016

(65) Prior Publication Data
US 2017/0265115 A1 Sep. 14, 2017

(30) Foreign Application Priority Data
Aug. 8, 2014 (GB) .................................. 1414129.5

(51) Int. Cl.
*H04W 28/08* (2009.01)
*H04W 36/16* (2009.01)
(Continued)

(52) U.S. Cl.
CPC ......... *H04W 36/165* (2013.01); *H04W 16/08* (2013.01); *H04W 28/08* (2013.01);
(Continued)

(58) Field of Classification Search
CPC ... H04W 28/08; H04W 36/22; H04W 36/165; H04W 36/38; H04W 16/08; H04W 36/00;
(Continued)

(56) References Cited

U.S. PATENT DOCUMENTS

2006/0128394 A1 6/2006 Turina et al.
2010/0304747 A1* 12/2010 Kazmi .................. H04W 36/08
455/436
(Continued)

FOREIGN PATENT DOCUMENTS

CN 101128059 A 2/2008
CN 101222759 A 7/2008
(Continued)

OTHER PUBLICATIONS

3rd Generation Partnership Project; Technical Specification Group Radio Access Network; Evolved Universal Terrestrial Radio Access (E-UTRA); User Equipment (UE) procedures in idle mode (Release 12), 3GPP TS 36.304 V12.1.0 (Jun. 2014), pp. 1-35.
(Continued)

*Primary Examiner* — Marcus Hammonds

(57) ABSTRACT

A mobile communications system is described in which base stations can communicate with each other or with a central coordinator to exchange idle mode UE load information so that decisions can be made to change cell specific or frequency specific priorities used by different cells within the network to balance the loading of idle mode UEs between cells.

10 Claims, 7 Drawing Sheets

(51) Int. Cl.
*H04W 48/18* (2009.01)
*H04W 36/00* (2009.01)
*H04W 16/08* (2009.01)
*H04W 36/38* (2009.01)
*H04W 28/16* (2009.01)
*H04W 72/04* (2009.01)
*H04W 88/08* (2009.01)

(52) U.S. Cl.
CPC ........... *H04W 36/00* (2013.01); *H04W 36/38* (2013.01); *H04W 48/18* (2013.01); *H04W 28/16* (2013.01); *H04W 72/0426* (2013.01); *H04W 88/08* (2013.01)

(58) Field of Classification Search
CPC . H04W 48/18; H04W 88/08; H04W 72/0426; H04W 28/16; H04L 4/125
See application file for complete search history.

(56) References Cited

U.S. PATENT DOCUMENTS

| | | | |
|---|---|---|---|
| 2012/0135739 | A1 | 5/2012 | Paterson |
| 2013/0336110 | A1* | 12/2013 | Sridhar ................. H04L 5/0044 370/230 |
| 2013/0337814 | A1 | 12/2013 | Wong et al. |
| 2014/0024382 | A1 | 1/2014 | Zou et al. |
| 2014/0066077 | A1* | 3/2014 | Brisebois ............. H04W 16/08 455/445 |
| 2014/0162636 | A1* | 6/2014 | Cui ....................... H04W 48/20 455/434 |
| 2014/0213277 | A1 | 7/2014 | Jang |
| 2014/0293776 | A1* | 10/2014 | Yang .................... H04W 28/08 370/229 |
| 2015/0304931 | A1* | 10/2015 | Xu ........................ H04W 36/32 370/331 |

FOREIGN PATENT DOCUMENTS

| | | |
|---|---|---|
| CN | 101370281 A | 2/2009 |
| CN | 101626589 A | 1/2010 |
| CN | 102045780 A | 5/2011 |
| CN | 102056260 A | 5/2011 |
| CN | 102131256 A | 7/2011 |
| CN | 102238556 A | 11/2011 |
| CN | 102469517 A | 5/2012 |
| CN | 102474784 A | 5/2012 |
| CN | 102547859 A | 7/2012 |
| JP | 2013-502083 A | 1/2013 |
| JP | 2015-529048 A | 10/2015 |
| WO | 2008/024055 A2 | 2/2008 |
| WO | 2008/024055 A3 | 2/2008 |
| WO | 2013/188392 A2 | 12/2013 |
| WO | 2014/014859 A1 | 1/2014 |
| WO | 2014/154851 A1 | 10/2014 |

OTHER PUBLICATIONS

3rd Generation Partnership Project; Technical Specification Group Radio Access Network; Evolved Universal Terrestrial Radio Access Network (E-UTRAN); X2 application protocol (X2AP) (Release 12), 3GPP TS 36.423 V12.2.0 (Jun. 2014), pp. 1-151.
International Search Report for PCT Application No. PCT/JP2015/003724, dated Oct. 23, 2015.
Written Opinion of the International Search Authority for PCT Application No. PCT/JP2015/003724.
Japanese Office Action for JP Application No. 2017-506950 dated Dec. 27, 2017 with English Translation.
Japanese Office Action for JP Application No. 2017-506950 dated Jul. 18, 2018 with English Translation.
Chinese Office Action for CN Application No. 201580042764.X dated Dec. 5, 2019 with English Translation.
Chinese Office Action for CN Application No. 201580042764.X dated Jul. 1, 2019 with English Translation.

* cited by examiner

[Fig. 1]
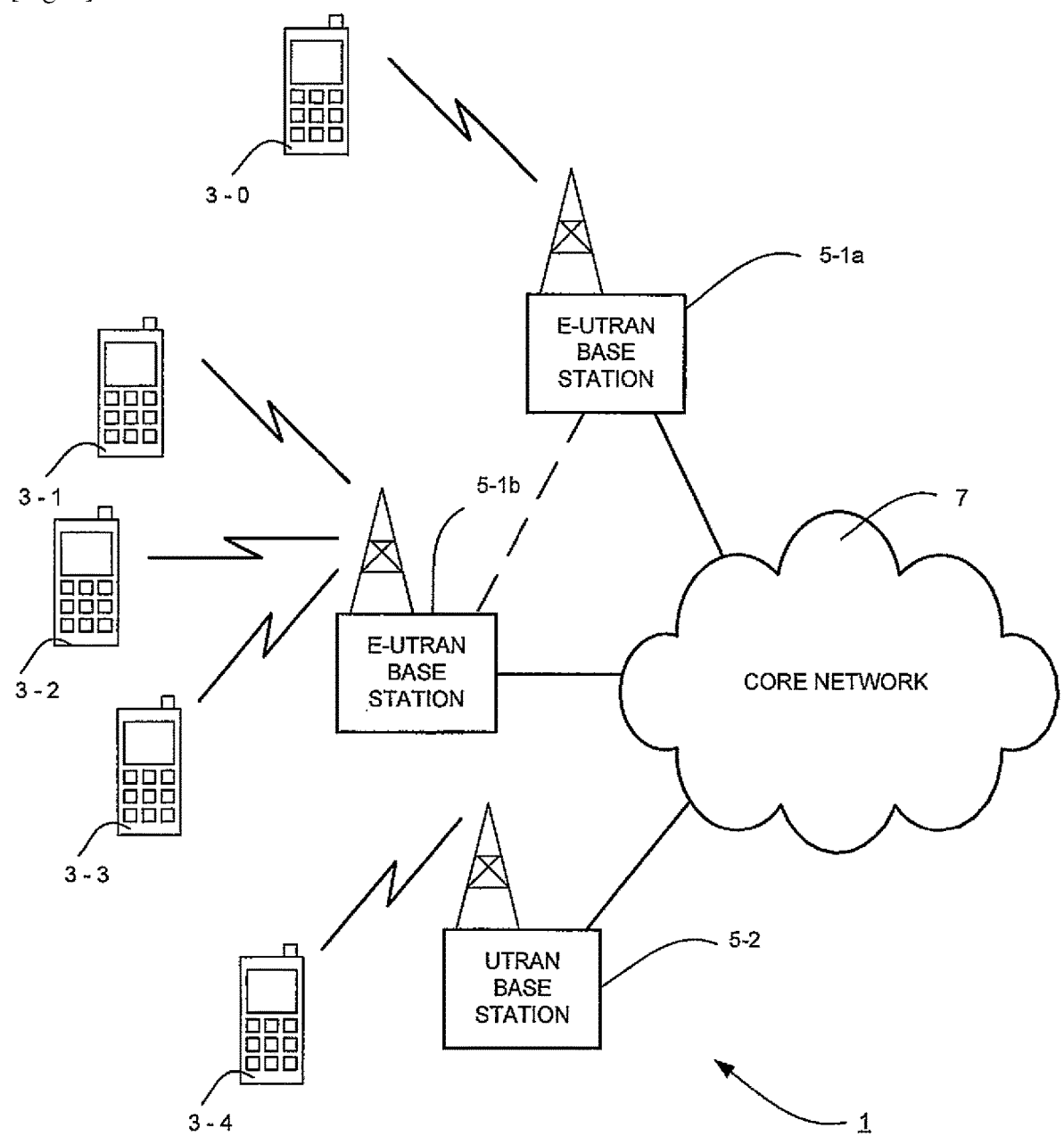

[Fig. 2]
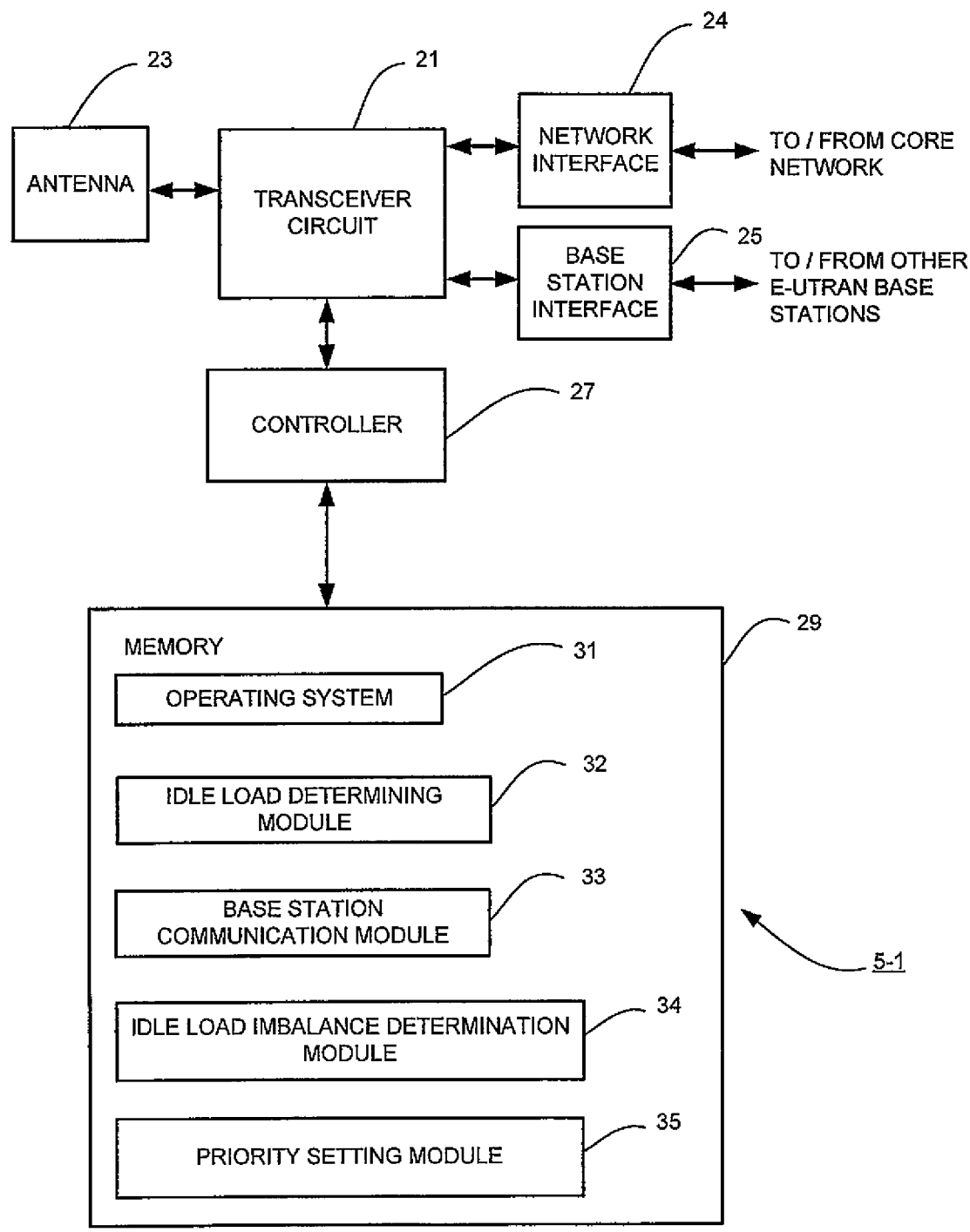

[Fig. 3]
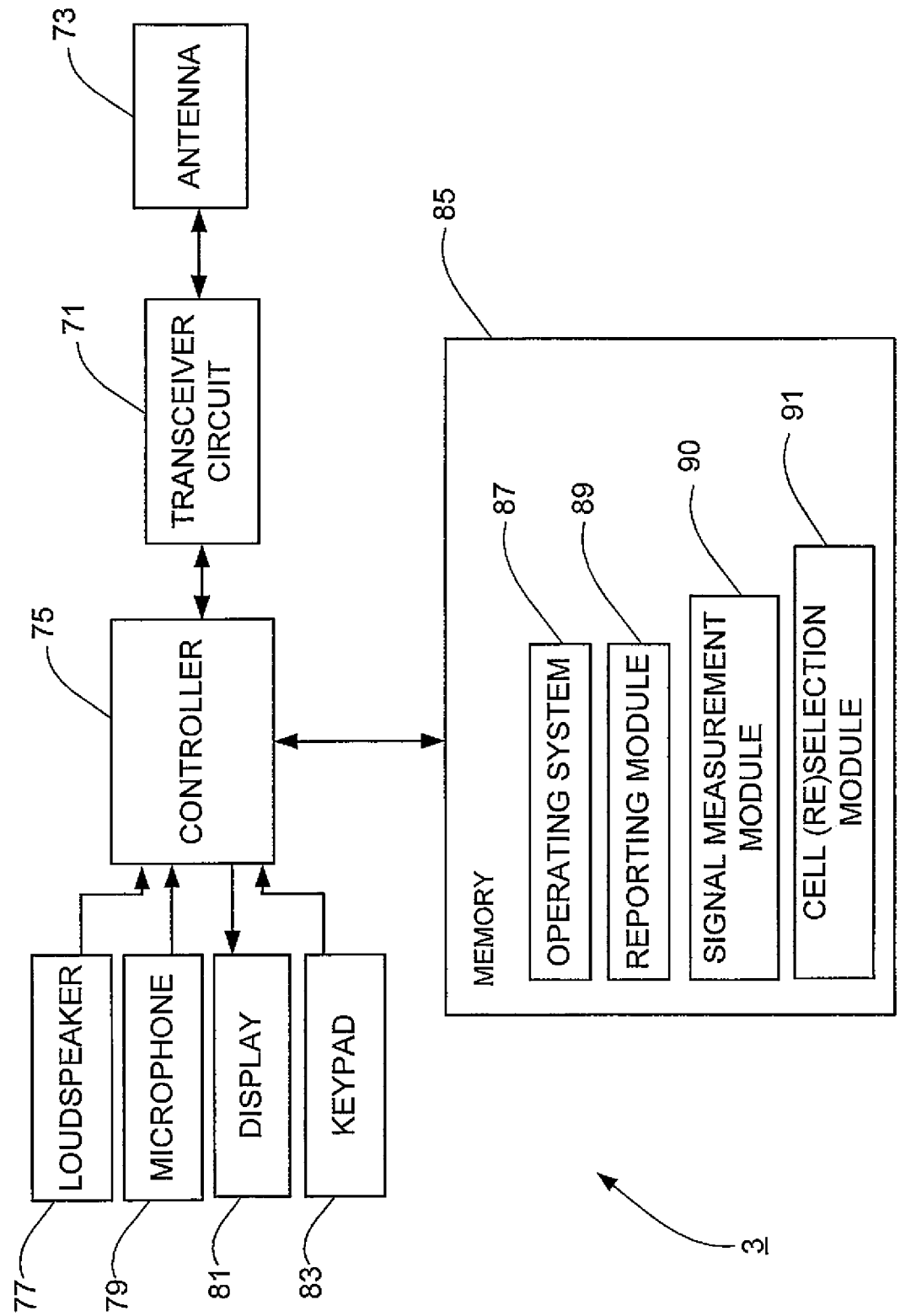

[Fig. 4]
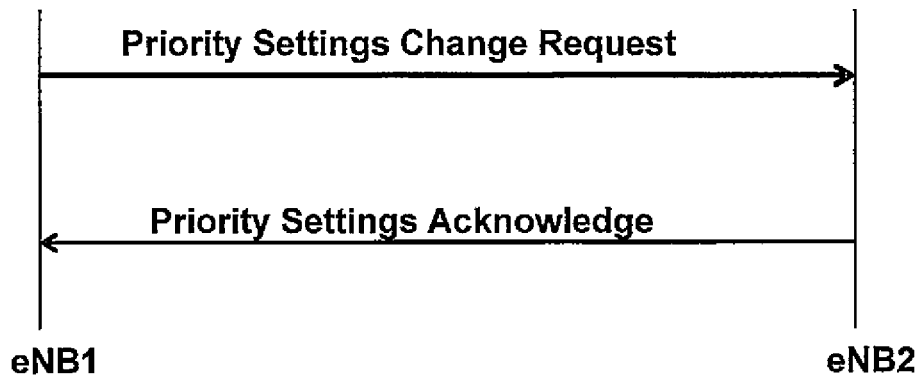
[Fig. 5]
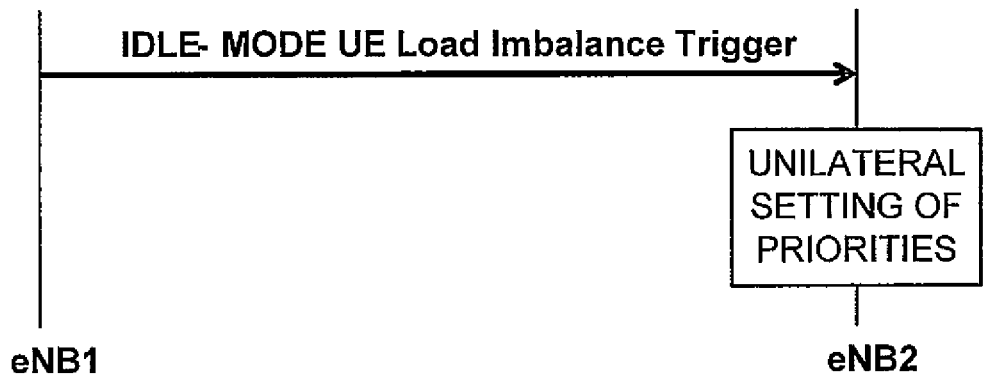

[Fig. 6]
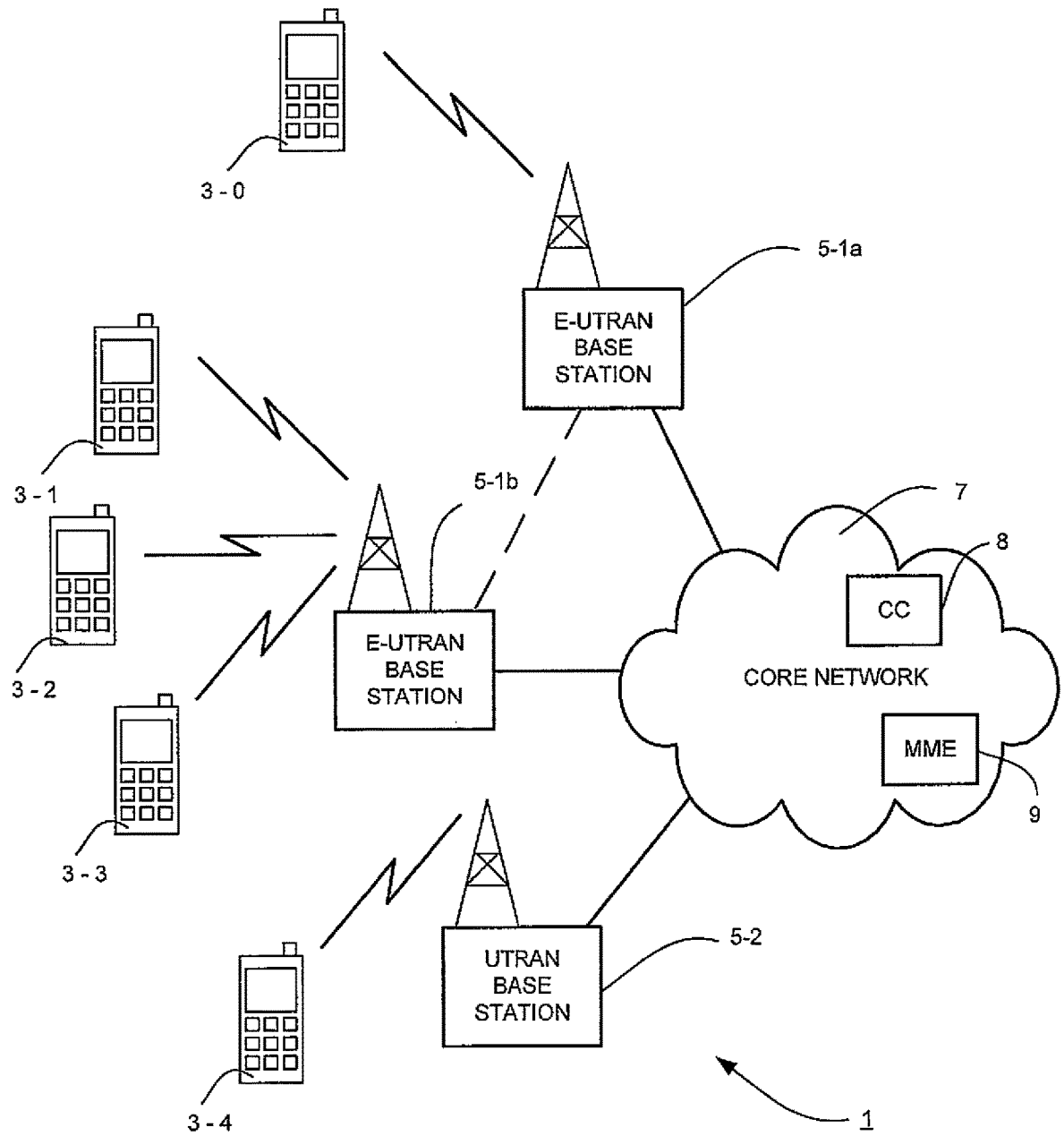
[Fig. 7]
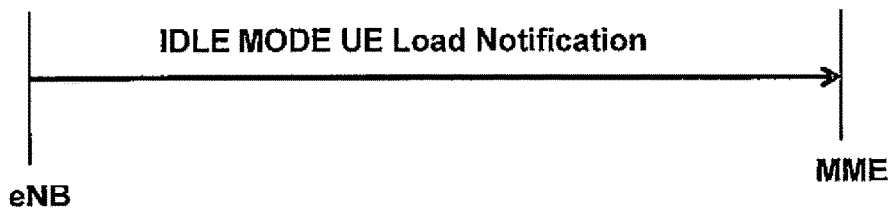

[Fig. 8]
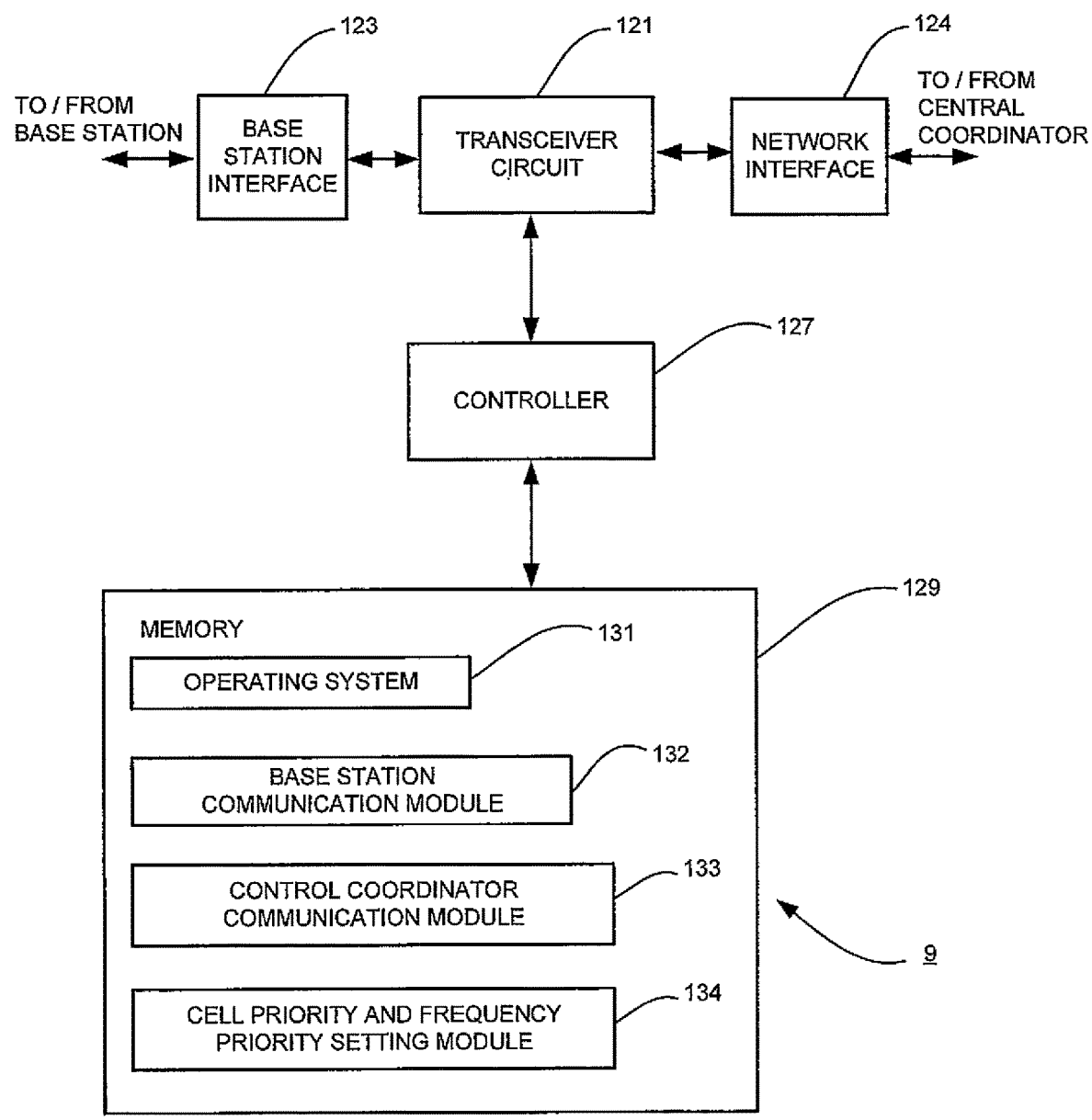

[Fig. 9]
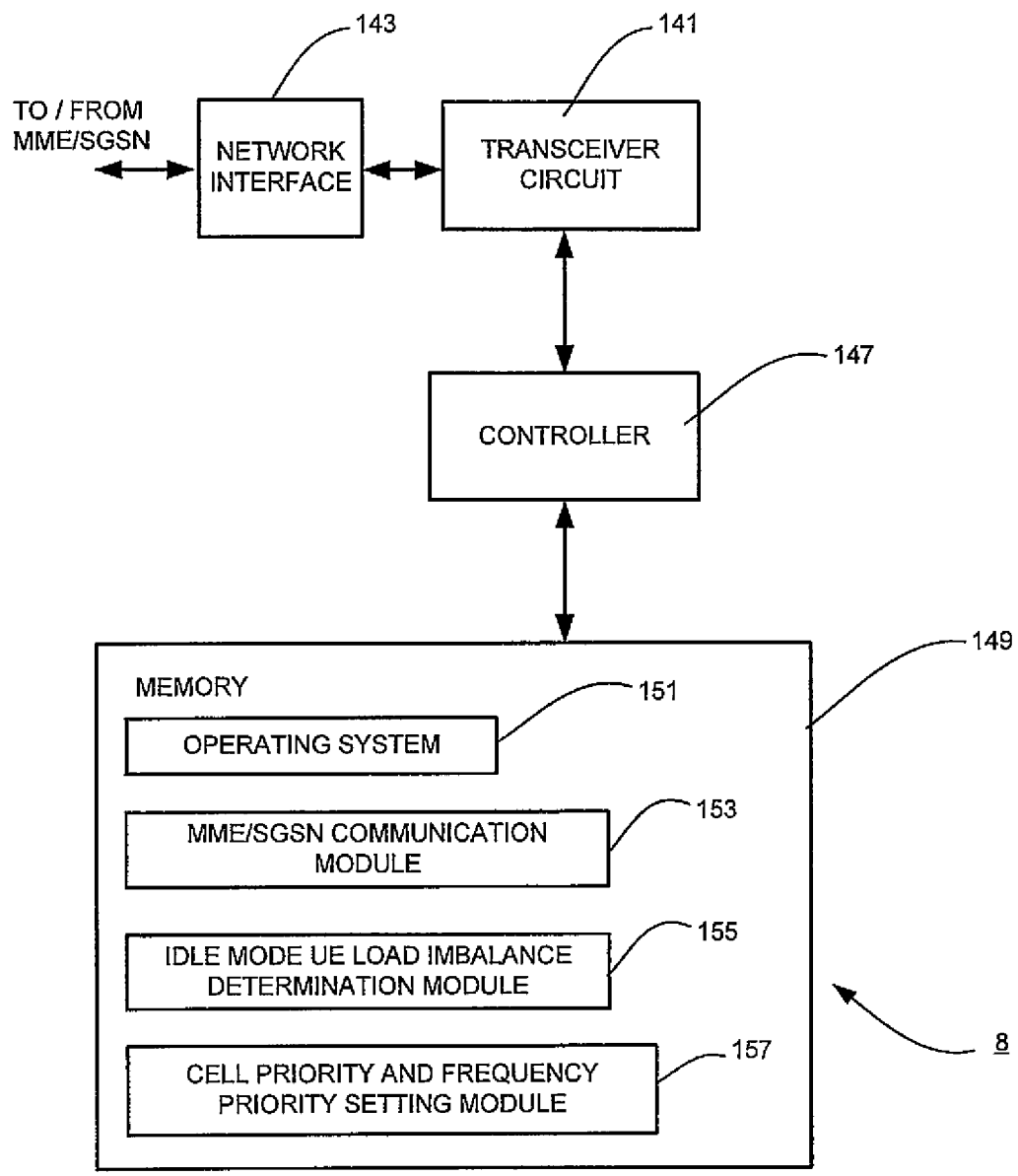

COMMUNICATIONS SYSTEM WITH IDLE MODE TERMINAL BALANCING

TECHNICAL FIELD

The present invention relates to mobile telecommunication networks, particularly but not exclusively networks operating according to the 3GPP standards or equivalents or derivatives thereof. The invention has particular although not exclusive relevance to the load balancing of idle mode user equipment between neighbouring base station cells.

BACKGROUND ART

In a cellular communications network, mobile devices or User Equipment (UE) roam from cell to cell as the user moves within the area covered by the cellular network. In order to make a determination of which cell a UE should register with, at regular intervals the UE makes various measurements of signals received from different cells and based on those measurements and cell selection parameters provided by the serving cell, selects the cell that is best suited to provide service to the mobile device, given its current position within the network. The cell selection process is based not only on the cell that has the strongest signal strength, but also on the services offered by the cell and hence the cell priority. For example, the strongest signal measured by the UE may be from a legacy GSM cell, yet the UE may select a higher priority E-UTRAN cell provided its signal strength is sufficient to provide an adequate service.

SUMMARY OF INVENTION

Technical Problem

A problem with this cell selection process is that it can lead to some cells being fully utilised whilst other cells are underutilised. This problem is addressed by performing load balancing to share scarcely available radio resources and the processing load between the available base station cells. For connected mode UEs, this involves a co-ordinated handover of UEs between base station cells to ensure continuity of service provided to the UE. For idle mode UEs, each base station simply adjusts its cell selection/reselection parameters in order to cause idle mode UEs to re-select another cell or base station.

However, to date, no standardised way has been proposed to distribute idle mode UEs between base stations.

Solution to Problem

Embodiments of the present invention aim to provide techniques for performing load balancing of idle mode UEs between base stations of the same or different Radio Access Technologies (RATs) in the same or different Tracking Areas (TAs).

According to one aspect, the present invention provides a communications node comprising: means for obtaining an idle mode user equipment, UE, loading within a first cell operated by a first base station and for obtaining an idle mode UE loading within a second cell operated by a second base station; means for comparing the idle mode UE loading within the first cell with the idle mode UE loading within the second cell to determine if there is a load imbalance in idle mode UEs camped within the first and second cells; and means for performing idle mode UE load balancing operations in dependence whether or not there is a load imbalance in idle mode UEs camped within the first and second cells. The communication node may be a base station or a central coordinator node of the core network.

According to another aspect, the present invention provides a base station comprising: means for determining an idle mode user equipment, UE, loading within a cell operated by the base station; means for receiving an idle mode UE loading for at least one cell operated by a neighbouring base station; and means for performing idle mode UE load balancing operations in dependence upon the received idle mode UE loading for the cell operated by the neighbouring base station and the determined idle mode UE loading for the cell operated by the base station.

According to another aspect, the present invention provides a base station comprising: means for determining an idle mode user equipment, UE, loading within a cell operated by the base station; means for transmitting the determined idle mode UE loading for the cell to one or more neighbouring base stations; and means for performing idle mode UE load balancing operations in the event that there is a load imbalance between the determined idle mode UE loading for the cell operated by the base station and an idle mode UE loading for a cell operated by any of the one or more neighbouring base stations.

According to another aspect, the present invention provides a central coordinator comprising: means for receiving an idle mode user equipment, UE, loading within a first cell operated by a first base station; means for receiving an idle mode UE loading within a second cell operated by a second base station; and means for performing idle mode UE load balancing operations in dependence upon the received idle mode UE loading for the first cell and the received idle mode UE loading for the second cell.

According to another aspect, the present invention provides a computer implementable instructions product comprising computer implementable instructions for configuring a programmable communications node to: obtain an idle mode user equipment, UE, loading within a first cell operated by a first base station and an idle mode UE loading within a second cell operated by a second base station; compare the idle mode UE loading within the first cell with the idle mode UE loading within the second cell to determine if there is a load imbalance in idle mode UEs camped within the first and second cells; and perform idle mode UE load balancing operations depending on whether or not there is a load imbalance in idle mode UEs camped within the first and second cells.

According to another aspect, the present invention provides a method performed by a base station, the method comprising: determining an idle mode user equipment, UE, loading within a cell operated by the base station; receiving an idle mode UE loading for at least one cell operated by a neighbouring base station; and performing idle mode UE load balancing operations in dependence upon the received idle mode UE loading for the cell operated by the neighbouring base station and the determined idle mode UE loading for the cell operated by the base station.

According to another aspect, the present invention provides a method performed by a base station, the method comprising: determining an idle mode user equipment, UE, loading within a cell operated by the base station; transmitting the determined idle mode UE loading for the cell to one or more neighbouring base stations; and performing idle mode UE load balancing operations in the event that there is a load imbalance between the determined idle mode UE loading for the cell operated by the base station and an idle mode UE loading for a cell operated by any of the one or more neighbouring base stations.

According to another aspect, the present invention provides a method performed by a central coordinator, the method comprising: receiving an idle mode user equipment, UE, loading within a first cell operated by a first base station; receiving an idle mode UE loading within a second cell operated by a second base station; and performing idle mode UE load balancing operations in dependence upon the received idle mode UE loading for the first cell and the received idle mode UE loading for the second cell.

BRIEF DESCRIPTION OF DRAWINGS

A number of embodiments of the invention will now be described, by way of example, with reference to the accompanying drawings in which:

FIG. 1 schematically illustrates a mobile telecommunication system of a first embodiment;

FIG. 2 schematically illustrates a base station forming part of the system shown in FIG. 1;

FIG. 3 schematically illustrates user equipment forming part of the system shown in FIG. 1;

FIG. 4 is a timing diagram illustrating a procedure used by two base stations to negotiate changes in cell or frequency priorities to address an imbalance in idle mode UE loadings between the two base stations;

FIG. 5 is a timing diagram illustrating an alternative procedure used by two base stations to change cell or frequency priorities to address an imbalance in idle mode UE loadings between the two base stations;

FIG. 6 schematically illustrates a mobile telecommunication system of a second embodiment;

FIG. 7 is a timing diagram illustrating the way in which a base station notifies a mobility management entity of its idle mode UE loading;

FIG. 8 schematically illustrates a Mobility Management Entity forming part of the system shown in FIG. 6; and FIG. 9 schematically illustrates a central coordinator forming part of the system shown in FIG. 6.

DESCRIPTION OF EMBODIMENTS

Example 1

First Embodiment

<Overview>

FIG. 1 schematically illustrates a mobile (cellular) telecommunication system 1 in which users of user equipment (UE) 3-0, 3-1, 3-2, 3-3 and 3-4 can communicate with other users (not shown) via one of the base stations 5-1a, 5-1b or 5-2 and a core network 7. The UEs may be mobile telephones, tablets, laptops, machine type communication devices or the like. In the system illustrated in FIG. 1, the base stations 5-1a and 5-1b are E-UTRAN base stations, with base station 5-1a currently serving UE 3-0 and base station 5-1b currently serving UEs 3-1, 3-2 and 3-3; and base station 5-3 is a UTRAN base station and it is currently serving UE 3-4. Each base station 5 operates a number of base station cells, each having a number of uplink and downlink communications resources (sub-carriers, time slots etc) that are available for wireless communication between the UEs 3 and the corresponding base station 5. However, in this embodiment, it will be assumed for the sake of simplicity of explanation, that each base station 5 operates a single cell. The base stations 5 allocate downlink resources to each UE 3 depending on the amount of data to be sent to the UE 3. Similarly, the base stations 5 allocate uplink resources to each UE 3 depending on the amount and type of data the UE 3 has to send to the base station 5.

As will be described in more detail below, in this first embodiment, the base stations 5 are configured to perform idle mode UE 3 load balancing themselves in a distributed manner. This happens through a number of steps. Firstly, each base station 5 is configured to measure the idle-mode load within its cell. That is to say the load on the base station 5 of UEs 3 that are camped in idle mode on the base station's cell. Each base station 5 then exchanges its determined idle mode load information with its neighbours and, from the exchanged information, determines if an idle mode UE load imbalance exists between the base stations 5. If such an imbalance does exist, then the base stations 5 can decide unilaterally or bilaterally to change cell (re)selection parameters (in this case cell specific or frequency specific priorities) to cause idle mode UEs 3 to be moved between the base stations 5 in order to reduce the imbalance in idle mode UE loadings on the different base stations 5.

<Base Station>

FIG. 2 is a block diagram illustrating the main components of the base stations 5 used in this embodiment. As shown, the base station 5 includes a transceiver circuit 21 which is operable to transmit signals to and to receive signals from the UEs 3 via one or more antennae 23 and to transmit signals to and receive signals from the core network 7 via the network interface (S1 interface in the case of an E-UTRAN base station 5-1) 24. The base station 5 also has a base station interface (X2 interface in the case of an E-UTRAN base station 5-1) 25 that allows the base station to communicate directly with other base stations 5-1. A controller 27 controls the operation of the transceiver circuit 21 in accordance with software and data stored in memory 29. The software and data includes, among other things, an operating system 31, an idle load determining module 32, a base station communication module 33, an idle load imbalance determination module 34 and a priority setting module 35.

The idle load determining module 32 is arranged to determine the load on the base station cell caused by UEs 3 that are operating in the idle mode. Techniques for determining this loading will be discussed later. This determined load may simply represent the number of idle mode UEs currently camped on the base station's cell; or it may be a number representing the proportion of the base station cell's capacity that is taken up by idle mode UEs. The base station communication module 33 then shares this idle mode UE load information with its neighbouring base stations. In the case of neighbouring E-UTRAN base stations, this information is shared via the X2 interface 25 and in the case of other types of base stations (base stations operating other Radio Access Technologies (RATs)), this information may be shared by transmitting the information via the core network 7 or by providing another dedicated interface to the other base station.

The table below illustrates an addition to an existing Resource Status Update message that includes the idle mode UE loading information that can be sent from one base station to another base station to inform the other base station of the idle mode UE loading. Similar additions could be made to the existing Resource Status Request message or the Resource Status Response message.

TABLE 1

| IE/Group Name | Presence | Range | IE type and reference | Semantics description | Criticality | Assigned Criticality |
|---|---|---|---|---|---|---|
| Message Type | M | | 9.2.13 | | YES | ignore |
| eNB1 Measurement ID | M | | INTEGER (1 ... 4095, ...) | Allocated by eNB$_1$ | YES | reject |
| eNB2 Measurement ID | M | | INTEGER (1 ... 4095, ...) | Allocated by eNB$_2$ | YES | reject |
| Cell Measurement Result | | 1 | | | YES | ignore |
| >Cell Measurement Result Item | | 1 ... <maxCellineNB> | | | EACH | ignore |
| >>Cell ID | M | | ECGI 9.2.14 | | | |
| >>Hardware Load Indicator | O | | 9.2.34 | | | |
| >>S1 TNL Load Indicator | O | | 9.2.35 | | | |
| >>Radio Resource Status | O | | 9.2.37 | | | |
| >>Composite Available Capacity Group | O | | 9.2.44 | | YES | ignore |
| >>ABS Status | O | | 9.2.58 | | YES | ignore |
| >> IDLE-MODE load | O | | 9.2.37 | | | |
| >> TAC | O | | OCTET STRING | Tracking Area Code. The TAI is derived using the current serving PLMN | | |

The base station communication module 33 also receives similar idle mode UE load measurements from the neighbouring base stations 5. The received measurements and the measurement determined by the idle load determining module 32 are all passed to the idle load imbalance determination module 34 which compares the measurements and determines, from the comparison result, if there is an imbalance in the idle mode UEs currently camping on its own cell compared with those camping on the cells of the other base stations. If the idle load imbalance determination module 34 determines that there is an imbalance then the priority setting module 35 can bilaterally agree with the or each other base station 5 where there is an imbalance, new cell specific priorities or frequency specific priorities to be used by idle mode UEs in the respective cells that will be used by the idle mode UEs to determine the cell on which they will camp. Alternatively, the idle load imbalance determination module 34 may send a message to the or each other base station 5 where there is an imbalance to trigger each of those other base stations 5 to unilaterally decide on an appropriate cell specific priority or frequency specific priority to be used in its cell. Base stations 5 that change their cell (re)selection priorities then transmit those new priorities to the UEs currently camping in its cell. The new priorities may be broadcast within the cell (such as within a System Information Block) or transmitted to specific UEs in, for example, RRCConnectionRelease messages. The reader is referred to Section 5.2.4.1 of standards document 3GPP TS 36.304 V12.1.0 for further details of how these cell reselection parameters may be provided to the UE 3.

In the above description, the base stations 5 are described for ease of understanding as having a number of discrete modules (such as the idle load determining module, the base station communication module, the idle load imbalance determination module and the priority setting module). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

<User Equipment>

FIG. 3 schematically illustrates the main components of each UE 3 shown in FIG. 1. As shown, the UE 3 includes a transceiver circuit 71 which is operable to transmit signals to and to receive signals from a base station 5 via one or more antennae 73. The UE 3 also includes a controller 75 which controls the operation of the UE 3 and which is connected to the transceiver circuit 71 and to a loudspeaker 77, a microphone 79, a display 81, and a keypad 83. The controller 75 operates in accordance with software instructions stored within memory 85. As shown, these software instructions include, among other things, an operating system 87, a reporting module 89, a signal measurement module 90 and a cell (re)selection module 91.

In this embodiment: the signal measurement module 90 is operable to make measurements on signals received from cells within range of the UE 3 and in accordance cell (re)selection parameters received from the base station 5 with which the UE 3 is currently registered. The reporting module 89 is operable to report the occurrence of specified events back to the serving base station 5. The cell (re)selection module 91 is responsible for prioritising the frequencies and the available cells and then selecting a suitable cell on which the UE can camp when operating in the idle mode of operation based on the cell (re)selection parameters preconfigured in the UE (upon initial selection) or received from the currently serving base station.

<Cell Reselection Parameters>

When a UE 3 is in an idle mode, the UE makes its own decision about the cell with which it will register/camp. The cell (re)selection parameters include frequency specific priorities that identify carrier frequencies that are preferred over other carrier frequencies. They also include, for at least a current carrier frequency associated with the cell on which the UE is currently camping, cell specific priorities identifying the priority of other cells also operating on the same frequency. Cell specific priorities may also be provided for other cells operating on different frequencies to the carrier frequency associated with the cell on which the UE is currently camped.

Bilateral Operation

As discussed above, when the idle load imbalance determination module 34 of a base station 5 determines that there is an imbalance in the idle mode UE loading between itself and one or more of its neighbouring cells, then the priority setting module 35 can bilaterally agree with the or each of the other base stations 5 where there is an imbalance, new cell specific priorities or frequency specific priorities to be used by idle mode UEs in the respective cells to determine the cell in which it is going to camp in idle mode. To achieve this for standardised LTE UEs, a new X2 class-1 procedure (a procedure that requires a response) needs to be defined in the 3GPP standards that allow the base stations to trigger and agree on the priorities. Such a procedure is illustrated in FIG. 4, which shows a first base station (eNB1) sending a Priority Settings Change Request to a second base station (eNB2), with the second base station sending, in response, a Priority Settings Acknowledge message back to the first base station.

Typically, the first base station (eNB1) will be the base station 5 that identifies that there is an imbalance between its own idle mode UE loading and the corresponding loading on another base station (which is the second base station, eNB2). The messages that are transmitted between the two base stations are used to negotiate and agree on cell specific or frequency specific (re)selection priorities, so that the idle mode load imbalance is addressed between the base stations in a coordinated manner. For example, if the first base station determines that its idle mode UE loading is currently at, for example, 50% of its overall capacity and that the idle mode UE loading on the second base station is currently at, for example, 20% of its overall capacity, then the first base station (eNB1) may reduce the priority associated with its own cell or frequencies used and try to agree with the second base station (eNB2) that it should increase the priority of its cell or frequencies used—so that it has a greater priority than the new priority of eNB1's cell or frequencies used. Each base station 5 then outputs the new priorities within its cell and this will cause UEs in the two cells to reselect the cell of the second base station in preference to cell of the first base station (subject of course to the UE 3 being within range of the second base station)—which will help to reduce the idle mode UE imbalance between the two base stations.

As those skilled in the art will appreciate, the base stations 5 may be programmed to periodically consider if there is an imbalance situation or they may be triggered to do so, for example, when their own idle mode UE loading exceeds a predefined threshold. The decision to initiate the above procedure may be taken based on, for example, whether the first base station determines that its idle mode UE loading is a predefined amount more than or less than the idle mode UE loading on the second base station.

The following table illustrates an exemplary Priority Settings Change Request that can be sent from a first base station (eNB1) to a neighbouring base station (eNB2):

TABLE 2

| IE/Group Name | Presence | Range | IE type and reference | Semantics description | Criticality | Assigned Criticality |
|---|---|---|---|---|---|---|
| Message Type | M | | 9.2.13 | | YES | reject |
| eNB1 Cell ID | M | | ECGI 9.2.14 | | YES | reject |
| eNB2 Cell ID | M | | ECGI 9.2.14 | | YES | reject |
| eNB1 Priority Parameters | O | | Priority Parameters Information 9.2.y | Cell Reselection change in eNB$_1$ cell | YES | ignore |
| eNB2 Proposed PriorityParameters | M | | Priority Parameters Information 9.2.z | Cell Reselection configuration change in eNB$_2$ cell | YES | reject |
| Cause | M | | 9.2.6 | | YES | reject |

As shown, the message includes the cell IDs for the relevant cells being operated by the two base stations and proposed new priority parameters for eNB2 (defined in the "eNB2 Priority Parameters" IE). The message can optionally contain the new priority parameters that the first base station (eNB1) has set for its own cell (defined in the "eNB1 Priority Parameters" IE). The priority parameters IE may define the change of the cell specific or the frequency specific cell reselection priority as compared to the current values and may have the following form:

TABLE 3

| IE/Group Name | Presence | Range | IE type and reference | Semantics description |
|---|---|---|---|---|
| Priority Change | | | | |
| >>EARFCN | O | | INTEGER (−20 . . . 20) | Ranking priority |
| >>cell-priority | O | | INTEGER (−20 . . . 20) | Ranking priority |

Where "EARFCN" is the frequency specific priority parameter, "cell-priority" is the cell specific priority parameter and the integer values indicate the amount by which the corresponding priority level is to be changed for the corresponding base station cell (or in an alternative embodiment the integer value may define the actual changed priority level that is proposed).

The following table illustrates an exemplary Priority Settings Change Acknowledge message that may be sent in response by eNB2 to eNB1, if the proposed changes to the priority settings are accepted by the second base station (eNB2):

TABLE 4

| IE/Group Name | Presence | Range | IE type and reference | Semantics description | Criticality | Assigned Criticality |
|---|---|---|---|---|---|---|
| Message Type | M | | 9.2.13 | | YES | reject |
| eNB1 Cell ID | M | | ECGI 9.2.14 | | YES | reject |
| eNB2 Cell ID | M | | ECGI 9.2.14 | | YES | reject |
| Criticality Diagnostics | O | | 9.2.7 | | YES | ignore |

The following table illustrates an exemplary Priority Settings Change Failure message that may be sent by eNB2 to eNB1 if the proposed changes to the priority settings are rejected by the second base station (eNB2):

TABLE 5

| IE/Group Name | Presence | Range | IE type and reference | Semantics description | Criticality | Assigned Criticality |
|---|---|---|---|---|---|---|
| Message Type | M | | 9.2.13 | | YES | reject |
| eNB1 Cell ID | M | | ECGI 9.2.14 | | YES | ignore |
| eNB2 Cell ID | M | | ECGI 9.2.14 | | YES | ignore |
| Cause | M | | 9.2.6 | | YES | ignore |
| eNB2 Priority Parameters Modification Range | O | | 9.2.z | | YES | ignore |
| Criticality Diagnostics | O | | 9.2.7 | | YES | ignore |

As shown, in this case the message sent back by the second base station (eNB2) to the first base station (eNB1) rejects the proposed changes to the second base station's priority parameters and instead the failure message includes an indication of an acceptable range of priorities that the second base station will allow (as defined in the "eNB2 Priority Parameters Modification Range" IE). This may be because the second base station may have agreed on priorities with other base stations. The table below illustrates the form that this Priority Parameters Modification Range IE can take:

TABLE 6

| IE/Group Name | Presence | Range | IE type and reference | Semantics description |
|---|---|---|---|---|
| Priority Change | | | | |
| >>EARFCN-Lower Limit | O | | INTEGER (−20 ... 20) | Ranking priority |
| >>EARFCN-Upper Limit | O | | INTEGER (−20 ... 20) | Ranking priority |
| >>cell-priority-Lower Limit | O | | INTEGER (−20 ... 20) | Ranking priority |
| >>cell-priority-Upper Limit | O | | INTEGER (−20 ... 20) | Ranking priority |

As shown, the message defines upper and lower limits on the change to the priority levels for the frequency specific priority parameter (EARFCN) and the cell-specific priority parameter (cell-priority). In response to receiving this message, the first base station (eNB1) can respond with a further Priority Settings Change Request, this time using a priority setting for the second base station's cell that is within the defined "modification range"; in which case the second base station (eNB2) would respond with the Priority Settings Change Acknowledge message that accepts the proposed settings (as shown in Table 3 above). The first base station may also reset its own proposed change to its cell specific or frequency specific priority parameter so that the desired load balancing of idle mode UEs will be achieved.

Unilateral Operation

As discussed above, when the idle load imbalance determination module 34 of a base station 5 determines that there is an imbalance in the idle mode UE loading between itself and one or more of its neighbouring cells, then the priority setting module 35 can send the or each other base station where there is an imbalance, a message to trigger each of those other base stations 5 to unilaterally decide on an appropriate cell specific priority or frequency specific priority to be used in their cell. The trigger to cause the other base station 5 to take this unilateral decision may be defined in an existing message that is sent between neighbouring base stations (such as in a Resource Status Update message or a Resource Status Request message or a Resource Status Response message—as defined in 3GPP TS 36.423 V12.2.0) or a new class-2 X2 procedure (a procedure that does not require a response) can be defined. FIG. 5 illustrates such an X2 class-2 procedure and shows a first base station (eNB1) sending an Idle-mode UE load Imbalance Trigger message to a second base station (eNB2). The first base station (eNB1) will be the base station 5 that identifies that there is an imbalance between its own idle mode UE loading and the corresponding loading on the second base station. As shown in FIG. 5, in response to receiving this trigger message, the second base station (eNB2) unilaterally changes the cell specific priority or the frequency specific priority of its own cell (and for other cells) within the cell (re)selection parameters that it transmits within its cell. The first base station (eNB1) may also unilaterally change the cell specific priority or frequency specific priority of its cell within the cell (re)selection parameters that it transmits within its cell.

The table below illustrates the form of a new trigger message that can be sent by a first base station to a second base station to cause the second base station to operate as discussed above. As shown, the first base station include, in the trigger message, the idle mode UE loading in its own cell (Served Cell Information) as well as the idle mode UE loading information it has for other cells of neighbouring base stations.

TABLE 7

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| Served Cell Information | | 1 ... <maxCellineNB> | | | — | — |
| >ECGI | M | | ECGI 9.2.14 | E-UTRAN Cell Global Identifier of the neighbour cell | — | — |
| >PCI | M | | INTEGER (0 ... 503, ... ) | Physical Cell Identifier of the neighbour cell | — | — |
| >EARFCN | M | | 9.2.26 | DL EARFCN for FDD or EARFCN for TDD | — | — |
| >TAC | O | | OCTET STRING (2) | Tracking Area Code | YES | ignore |
| >IDLE-MODE UE Load | O | | 9.2.37 | | | |
| Neighbour Information | | 0 ... <maxnoofNeighbours> | | | — | — |
| >ECGI | M | | ECGI 9.2.14 | E-UTRAN Cell Global Identifier of the neighbour cell | — | — |
| >PCI | M | | INTEGER (0 ... 503, ... ) | Physical Cell Identifier of the neighbour cell | — | — |
| >EARFCN | M | | 9.2.26 | DL EARFCN for FDD or EARFCN for TDD | — | — |
| >TAC | O | | OCTET STRING (2) | Tracking Area Code | YES | ignore |
| >IDLE-MODE UE Load | O | | 9.2.37 | | | |

\* Explanation of Range bound
maxCellineNB: Maximum no. cells that can be served by an eNB. Value is 256.
maxnoofNeighbours: Maximum no. of neighbour cells associated to a given served cell. Value is 512.

Note, however, that this trigger can simply contain the message type, the first base station identifier (for the base station that identifies the imbalance) and an indication of whether there is an under-loaded or an overloaded condition with respect to the second base station. On receiving this trigger, the second base station will rectify the imbalance by either increasing its priorities (when it is under-loaded compared with the loading on the first base station cell) or by decreasing its priorities (when it is over-loaded compared with the loading on the first base station cell) with respect to those of the first base station.

Example 2

Second Embodiment

In the first embodiment described above, the idle mode load balancing is controlled in a distributed manner between the base stations 5. In the second embodiment, the process is controlled via a central coordinator (CC).

FIG. 6 schematically illustrates a mobile (cellular) telecommunication system 1 according to the second embodiment. The same reference numerals indicate corresponding parts to those shown in FIG. 1 and will not be described in detail again. As can be seen, in this embodiment, the core network 7 includes a Central Coordinator (CC) 8 and a number of Mobility Management Entities (MMEs) 9. The MME 9 is the main control node for E-UTRAN base stations 5-1 and controls procedures such as mobility of the UEs 3 between base stations 5 when in connected mode, user authentication, tracking area management, roaming control etc. The core network 7 also has a number of similar control nodes (such as SGSN nodes—not shown) that perform corresponding functions for UTRAN and GERAN type base stations.

In this embodiment, the base stations 5 simply determine their own idle mode UE loading and transmit this to their controlling MME(s) 9 or SGSN(s) via the network interface 24 (S1 interface in the case of an E-UTRAN base station 5-1). This procedure is illustrated in FIG. 7. The table below illustrates the form that this reporting message may take in some embodiments.

TABLE 8

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| List of TAIs | | 1 | | | YES | ignore |
| >TAI List Item | | 1 ... <maxnoofTAIs> | | | EACH | ignore |
| >>TAI | M | | 9.2.3.16 | | — | |
| >> IDLE-MODE UE Load | O | | 9.2.37 of TS 36.423 | | | |
| CSG Id List | | 0 ... 1 | | | GLOBAL | ignore |
| >CSG Id | | 1 ... <maxnoofCSGId> | 9.2.1.62 | | — | |

As shown, the base station 5 provides, for each tracking area (indicated by the Tracking Area Identifier (TAI)—as the base station 5 can operate multiple cells that are assigned to different tracking areas), the idle mode UE load. The MMEs 9 (or SGSNs) gather this idle mode UE loading information from the different base stations 5 and reports these to the central coordinator 8. The core network 7 has many MMEs 9 and SGSNs, each controlling base stations and UEs in a respective different part of the network 7. Each of the MMEs/SGSNs reports the idle mode UE loading information it receives from the base stations 5 it controls, to the central coordinator 8. Thus, the central coordinator 8 will receive idle mode UE loading information per cell per Radio Access Technology (RAT) and per Tracking Area (TA). The central coordinator 8 can then compare the idle mode UE loadings in different parts of the network and can set the frequency specific priorities and/or the cell specific priorities for each cell, in order to try to balance the idle mode UEs within the network. The central coordinator can compare the idle mode UE loadings on a cell by cell basis, on a base station by base station basis or on a tracking area by tracking area basis so that the idle mode UE load balancing can be performed to balance the loading between cells, between base stations or between tracking areas. The changes made by the central coordinator 8 may also be used to try to achieve a desired idle mode UE loading per cell of each RAT or to achieve a desired idle mode UE loading in each cell of a given Tracking Area (TA) regardless of the RAT used, etc. The changes to the cell specific priorities and to the frequency specific priorities that the central coordinator 8 makes are then transmitted back to each of the base stations 5 via the MMEs/SGSNs. The priority setting module 35 in each base station 5 then makes the changes to the sell (re)selection parameters that it transmits within its cell. In this way, the idle mode UE loading across the network is controlled by the central coordinator 8. As those skilled in the art will appreciate, in this embodiment, the base station 5 does not need the idle load imbalance determination module 34 (as this determination is being performed by the central coordinator 8).

<Mobility Management Entity>

FIG. 8 is a block diagram illustrating the main components of an MME 9 used in this embodiment (an SGSN will have a similar structure). As shown, the MME 5 includes a transceiver circuit 121 which is operable to transmit signals to and to receive signals from the base stations 5 via a base station interface 123 and to transmit signals to and receive signals from the central coordinator 8 via a network interface 124. The MME 9 also has a controller 127 that controls the operation of the transceiver circuit 121 in accordance with software and data stored in memory 129. The software and data includes, among other things, an operating system 131, a base station communication module 132, a control coordinator communication module 133 and a cell priority and frequency priority setting module 134.

The base station communication module 132 communicates with the base stations 5 and receives the idle mode UE load information relating to each cell operated by each base station. The control coordinator communication module 133 forwards the idle mode UE loading information to the central coordinator 8; and receives back any updated cell priorities and frequency priorities for the different cells in the network. In response, the cell priority and frequency priority setting module 134 sends messages out to the different base stations updating their cell and frequency priorities for output in their respective cells.

<Central Coordinator>

FIG. 9 is a block diagram illustrating the main components of the central coordinator 8 used in this embodiment. As shown, the central coordinator 8 includes a transceiver circuit 141 which is operable to transmit signals to and to receive signals from the MMEs/SGSNs via a network interface 143. The central coordinator also has a controller 147 that controls the operation of the transceiver circuit 141 in accordance with software and data stored in memory 149. The software and data includes, among other things, an operating system 151, an MME/SGSN communication module 153, an idle mode UE load imbalance determination module 155 and a cell priority and frequency priority setting module 157.

The MME/SGSN communication module 153 receives the idle mode UE load reports for each cell in each tracking area from the MMEs and the SGSNs. The idle mode UE load imbalance determination module 155 analyses the received load information and detects any imbalance of idle mode UE loading in the network. The cell priority and frequency priority setting module then determines appropriate changes to current cell priorities and frequency priorities used within the network that will help to reduce these idle mode UE load imbalances. The MME/SGSN communication module 153 then transmits the determined changes to the cell priorities and frequency priorities to the respective MMEs/SGSNs for onward transmission to the respective base stations.

Idle Mode UE Load Determination

The idle mode UE load determination can be performed in a number of different ways. Some of these will now be described and can be used in either of the embodiments described above.

One option is for the base station to transmit a paging request that requests all idle mode UEs to respond. This technique will provide an accurate estimate of the current idle mode UE load on each cell. However, this technique requires a lot of system resources over the air interface and is not therefore desirable to use on a regular basis.

Another option to determine the idle mode UE load in a cell is to estimate it as predetermined percentage of the live connected mode UE load on the cell. In particular, each base station 5 can determine, in advance, for each of its cells, what its current idle mode UE loading is for different actual connected mode UE loads (for example using the paging technique described above). This data can then be analysed and a statistical correlation determined between the live connected mode UE load and the idle mode UE load. If multiple operators share a cell, then different percentages can be applied for each operator based on the statistical analysis.

Another option is for the base station to learn this from UE Related Signalling such as:
- from RRC Connection Establishment cause (Attach, Detach and TAU uses MO-Signalling)—ATTACH and TAU Results in EMM-REGISTERED STATE—but corresponds to RRC IDLE MODE
- from SRB0 (CCCH)/SRB1 (DCCH)/SRB2 (DCCH) Assignment
- from the number of Incoming/outgoing handovers: An eNB can count the number of incoming handovers and outgoing handovers. Also, it can take into account the number of connection releases happening together with new Service Request related connection establishment messages it receives.
- from Idle mode mobility estimation: from Rel-8 the E-UTRAN base stations 50-1 can keep the UE history information which includes the LastVisitedCellInfo (max 16 cells) and would transfer it at handover. In Rel-12, it has been agreed that the UE reports the mobility state (mobilityState) at RRCConnectionSetupComplete. Also the UE may report the mobility history information, which includes history information during IDLE (and CONN) mode, after the RRC connection setup procedure. Using this information, the base station 5 can estimate the UE's moving speed and when the base station indicates the RRC connection release for a UE, the base station can then estimate how long this UE will be staying in the cell based on the estimated speed.
- from the number of UEs with "delay-tolerant" access: In Rel-10, new EstablishmentCause "delayTolerantAccess" was introduced for MTC (Machine Type Communication) UEs. Also, in Rel-11 Extended Access Barring (EAB) in SIB14 was introduced for delay tolerant access. So, taking into account the (main) purpose for supporting the delay tolerant access, those UEs will be (or are most likely to be) stationary UEs, e.g. smart meters and the like. The base station can then consider that those UEs will be staying in the same cell normally.

The above loading calculations can be updated and averaged over a sliding window so that the moving average of the idle mode UE loading in a cell is tracked.

Modifications and Alternatives

Detailed embodiments have been described above. As those skilled in the art will appreciate, a number of modifications and alternatives can be made to the above embodiments whilst still benefiting from the inventions embodied therein.

In the above embodiments, a number of software modules were described. As those skilled will appreciate, the software modules may be provided in compiled or un-compiled form and may be supplied to the base stations or to the UEs as a signal over a computer network, or on a recording medium. Further, the functionality performed by part or all of this software may be performed using one or more dedicated hardware circuits. However, the use of software modules is preferred as it facilitates the updating of the base stations 5 and the UEs 3 in order to update their functionalities.

In the second embodiment described above, the MMEs/SGSNs simply forwarded the idle mode UE loadings to the central coordinator. In an alternative embodiment, the MMEs/SGSNs may process the idle mode UE loading information and only notify the central coordinator in the event that the MME/SGSN identifies an imbalance.

In the second embodiment described above, each of the base stations reported idle mode UE loading to its controlling MME or pool of MMEs. Alternatively, the base stations may be configured, in some embodiments, to report this idle mode UE load information directly to the central coordinator.

In the second embodiment described above, the base stations reported the idle mode UE loading in each cell and reported the tracking area to which the cell belongs (using the TAI). This allows the central coordinator to determine the idle mode UE loading in all the cells of a given tracking area. As an alternative to providing the TAI, the base station may provide the E-UTRAN Cell Global Identifier—which globally identifies the cell within the network. This allows the central coordinator to determine the tracking area from other pre-stored information which indicates in which tracking area each cell belongs. Whilst the term "tracking area" is a term used in E-UTRAN networks, a similar division of the networks is carried out in UTRAN and GERAN networks (such as Routing Areas or Location Areas in UMTS). As those skilled in the art will appreciate, the central coordinator may perform similar idle mode UE load balancing over such routing or location areas for cells within these other RAT networks.

In the above embodiments, the cell (re)selection parameters that were changed in order to control the idle mode UE loading between cells of neighbouring base stations were the cell specific priorities or the frequency specific priorities of the relevant cells. In other embodiments, other cell (re)selection parameters as described in standards document TS 36.304 V12.1.0 could be used in addition or instead.

This invention has been described above by way of the embodiment, but this invention is not limited to the embodiment described above. Various changes that can be understood by a person skilled in the art can be made to the configuration and details of this invention within the scope of this invention. Various other modifications will be apparent to those skilled in the art and will not be described in further detail here.

This application is based upon and claims the benefit of priority from UK patent application No. 1414129.5, filed on Aug. 8, 2014, the disclosure of which is incorporated herein in its entirety by reference.

Glossary of 3GPP Terms

LTE—Long Term Evolution (of UTRAN)
UE—User Equipment
DL—downlink—link from base to mobile
UL—uplink—link from mobile to base
MME—Mobility Management Entity
HO—Handover
RLC—Radio Link Control
RRC—Radio Resource Control
E-UTRAN—Evolved Universal Terrestrial Radio Access Network
UTRAN—Universal Terrestrial Radio Access Network
GERAN—GSM/Edge Radio Access Network TA—Tracking Area
RAT—Radio Access Technology

The invention claimed is:

1. A communications node comprising:
a controller comprising at least one processor configured to:
obtain an idle mode user equipment (UE) loading within a first cell operated by a first base station and obtain an idle mode UE loading within a second cell operated by a second base station;
compare the idle mode UE loading within the first cell with the idle mode UE loading within the second cell to determine if there is a load imbalance in idle mode UEs camped within the first and second cells; and
perform idle mode UE load balancing operations in dependence upon whether or not there is a load imbalance in idle mode UEs camped within the first and second cells,
wherein:
the communication node is the first base station,
the first cell is a cell operated by the first base station,
the second cell is a cell operated by a neighboring base station, which is the second base station,
when there is an imbalance in the idle mode UE loading of the first cell of the first base station and the second cell of the neighboring base station, said controller is further configured to bilaterally negotiate changes to priority parameters with said neighboring base station, and
when the first base station receives a message comprising an indication of an acceptable range of the priority parameter from said neighboring base station, said controller is further configured to request a change of the priority parameter in accordance with the acceptable range, and
the message comprising the indication of the acceptable range of the priority parameter is transmitted from said neighboring base station when the said neighboring base station has agreed on priorities with a third base station.

2. A communication node according to claim 1, wherein the controller is further configured to determine the idle mode UE loading within said first cell operated by the first base station and receive the idle mode UE loading within said second cell operated by the neighboring base station.

3. A communication node according to claim 2, wherein the controller is further configured to transmit the determined idle mode UE loading within the first cell to one or more neighboring base stations.

4. A communication node according to claim 1, wherein the communication node is a central coordinator node and arranged to receive said idle mode UE loadings for said first and second cells from said first and second base stations.

5. A communication node according to claim 4, wherein the controller is further configured to receive idle mode UE loading information for cells within different areas of a communication network and wherein the controller is further configured to perform load balancing operations to try to balance idle mode UEs across cells within the same area.

6. A communication node according to claim 4, wherein the controller is further configured to receive idle mode UE loading information for a plurality of cells within different areas of a communication network and, for each cell, data for identifying the area of the communication network in which the cell is located.

7. A communication node according to claim 4, wherein the controller is further configured to receive idle mode UE loading information for cells operating under different Radio Access Technologies, RATs, and arranged to perform load balancing operations to try to balance idle mode UEs across cells operating under the same RAT.

8. A communication node according to claim 1, wherein the controller is further configured to vary cell selection or reselection parameters that are associated with one or more cells to perform said idle mode UE load balancing.

9. A communication node according to claim 8, wherein the controller is further configured to vary one or more cell priorities or frequency priorities within the cell selection or reselection parameters that a base station transmits within a cell.

10. A base station comprising:
a controller comprising at least one processor, configured to:
determine an idle mode user equipment (UE) loading within a cell operated by the base station;
receive an idle mode UE loading for at least one cell operated by a neighboring base station; and
perform idle mode UE load balancing operations in dependence upon the received idle mode UE loading for the cell operated by the neighboring base station and the determined idle mode UE loading for the cell operated by the base station,
wherein when there is an imbalance in the idle mode UE loading of a first cell of the base station and a second cell of the neighboring base station, said controller is further configured to bilaterally negotiate changes to priority parameters with said neighboring base station, and
when the base station receives a message comprising an indication of an acceptable range of the priority parameter from said neighboring base station, said controller is further configured to request a change of the priority parameter in accordance with the acceptable range, and
the message comprising the indication of the acceptable range of the priority parameter is transmitted from said neighboring base station when the said neighboring base station has agreed on priorities with a third base station.

* * * * *